Dec. 24, 1929.　　　G. McCRETTON　　　1,740,992
CHAIN ATTACHMENT
Filed Sept. 27, 1928

INVENTOR
GEORGE McCRETTON
by his attorneys
Howson and Howson

Patented Dec. 24, 1929

1,740,992

UNITED STATES PATENT OFFICE

GEORGE McCRETTON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT

CHAIN ATTACHMENT

Application filed September 27, 1928. Serial No. 308,790.

The invention relates to attachments for chains, especially attachments which may be used to adjust the length of chains with which they coact. The invention is particularly useful in connection with chain loops, and may be employed to adjust the size of such loops.

An object of the invention is to provide a simple attachment which may be employed to fasten a chain end to another length of chain. Another object is to provide an attachment of this class which will serve to fasten a chain in such manner as to form a loop. A further object is to provide an attachment of this kind which may be quickly and easily applied to adjust the size of the chain loop. Still a further object is to provide such an attachment in a form which will function with the chain alone, requiring no additional parts to fasten or adjust the chain.

In the past chains have been connected and adjustable chain loops have been secured by means of an attachment including a cylindrical shell through which the chain extends, and another part fastened to the chain end and co-operating with the shell to prevent sliding of the chain therethrough. I have now discovered that a simpler construction may be employed wherein the shell alone comprises the attachment and no additional part need be fastened to the chain end. By giving the attachment a novel form, it is merely necessary to pull the desired length of chain through the shell and insert the end link of the chain in position within the shell in order to determine the size of the loop and prevent sliding of the chain therethrough.

By way of example, the invention is illustrated in its application to a loop of ball chain in the accompanying drawings, wherein—

Figure 1:
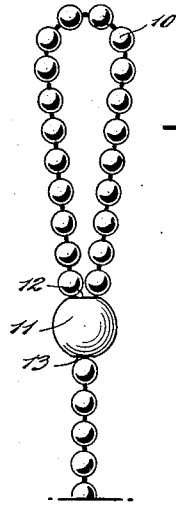
Figure 2:
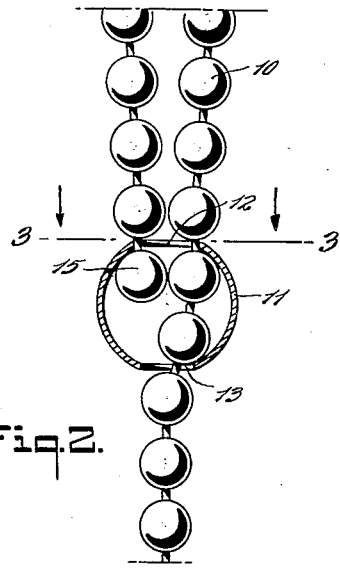
Figure 3:
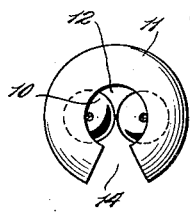
Figure 4:
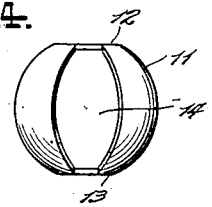
Figure 5:
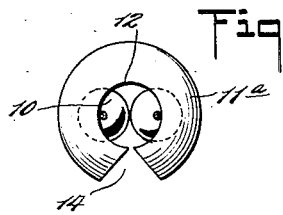
Figure 6:
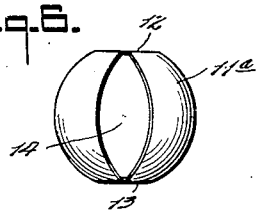

Figure 1, is a general view of a ball chain loop assembly embodying the invention, Fig. 2, is a similar view on an enlarged scale showing only a part of a chain loop, the shell or attachment being shown in section, Fig. 3, is a plan view of the attachment, that part of the chain being shown which is held within the shell, Fig. 4, is an elevation of the attachment, Fig. 5, is a view similar to Fig. 3, showing a modified form of attachment, and Fig. 6, is a view similar to Fig. 4, showing a modified form of attachment.

My invention consists essentially in an attachment for a chain, which comprises a shell having opposite holes therein of sufficient size to permit passage of the chain through the shell. One hole is of sufficient size to permit confinement within the shell beside the chain extending therethrough, of a chain end, the chain adjacent the chain end projecting through the hole next the other part of the chain. An opening in the shell connects the holes and this opening is of sufficient size intermediate the holes to permit passage of an end link of a chain therethrough. The attachment thus comprises a shell which is slidable upon a chain. When the end link is passed through the opening connecting the two holes and drawn into place adjacent one of the holes, the position of the attachment upon the chain extending through it is fixed and the attachment cannot slide upon the chain, nor can the chain slide through the attachment. The length on either side of the attachment of the chain passing therethrough may thus be determined and fixed, or the size of a chain loop may be fixed if the chain end referred to be the end of the chain passing through the attachment.

In the drawings there is shown a loop of ball chain 10 whose size is determined by the inter-action of the chain and an attachment 11. The attachment 11 is formed as a substantially spherical hollow shell having in it two diametrically opposite holes 12 and 13. Each of the holes 12 and 13 is of sufficient size to permit passage of the chain balls through the shell, the hole 12 being large enough to accommodate at the same time the constricted parts of two adjacent sections of chain extending therethrough, as best illustrated in Fig. 2. Obviously the hole 13 need not be smaller than the hole 12.

An opening 14 in the shell connects the holes 12 and 13, and is wide enough intermediate the holes to permit the end ball 15 to enter the shell. The opening 14 tapers, however, as it approaches the holes in order that the balls lying within the shell may be held in place.

In order to form a loop in the chain, in the form of the invention here illustrated, the chain end is threaded through the attachment 11, the end ball 15 passing into the shell through the hole 13 (which is here shown as being the smaller of the two holes) and out of the shell through the hole 12.

The loop is now formed by pulling the chain through the attachment and turning it until the desired size is obtained. When this has been done the end ball 15 of the chain is passed through the opening 14 into the shell and is pulled up adjacent the hole 12. The neck of the dumb-bell connecting the end ball 15 with the ball next to it in the chain is passed within the hole 12, and the loop of chain 10 is held from movement through the attachment as illustrated in Fig. 2. The size of the loop is thus fixed.

In order to adjust the loop to a different size, the dumb-bell neck adjacent the end ball 15 is moved out of the hole 12 through the opening 14, and the end ball 15 is moved away from the hole 12. The chain may then be moved through the shell to form any other desired size of loop, after which the end ball is moved into locking position as before, thus fixing the size of loop.

Whether the end ball 15 must be withdrawn from the shell in order that the loop be adjusted depends, of course upon the relative sizes of the shell and the chain balls.

I may prefer to constrict the size of the junction between the opening 14 and the hole 12 to such an extent that the dumb-bell neck must be forced into the hole 12 against the resiliency of the material of which the shell is formed. (See Fig. 5.) If this be done, the end ball 15 cannot be unintentionally moved out of locking position. I may also make the opening 14 of such width that the end ball must be forced within the shell against the shell's resiliency, and will then be retained within the shell until intentionally withdrawn. Such an opening is of particular value where the shell is made of such size that the end ball 15 may be retained within the shell during adjustment of the loop.

From the foregoing description it will be seen that an attachment formed in accordance with the invention is simple, easily formed, and requires no co-operating additional part in order that it may serve to hold a chain end in the form of a loop. Once the end link is inserted within the shell and brought into position the size of loop is determined. In order to adjust the loop to a different size, the end link need merely be withdrawn from its position so that the chain may slide through the attachment.

While the invention is specifically illustrated in its application to a ball chain and to a loop, it is not necessarily limited to such applications and may be equally well employed in connection with other types of chain and in connecting two separate chains (as would be the case were there no connection of the chain above the point where Fig. 2 is cut off at the top). Further, the invention is not necessarily limited to the precise construction of attachment illustrated.

I claim:

1. An attachment adapted to hold two pieces of chain together, comprising a shell having a hole therein of sufficient size to permit passage of the chain therethrough and a second hole positioned oppositely to the first hole, the second hole being of a size adapted to accommodate at the same time the constricted parts of two adjacent sections of chain extending therethrough, said shell also having an opening connecting with the second hole of sufficient size to permit passage of the end link of a chain therethrough.

2. An attachment for ball chains comprising a substantially spherical hollow shell having two diametrically opposite holes therein, of sufficient size to permit passage of the ball chain through the shell, one hole being large enough to accommodate at the same time the constricted parts of two adjacent sections of chain extending therethrough.

3. An attachment for a looped chain comprising a shell having opposite holes therein of sufficient size to permit passage of the chain through the shell, and an opening connecting the holes, one hole being of a size adapted to confine within the shell a chain end beside the chain extending therethrough.

4. An attachment for a looped chain comprising a shell having opposite holes therein of sufficient size to permit passage of the chain through the shell, and an opening connecting the holes of sufficient size intermediate the holes to permit insertion of the end link of the chain within the shell, one hole being of a size adapted to confine within the shell a chain end in addition to the chain extending therethrough, substantially as described.

5. For looping a chain about another part, a shell having opposite holes therein, an end of the chain slidable through the holes, and an end link of said chain end insertible within the shell and engaging therein said chain end to prevent it from sliding through the shell.

6. For looping a chain about another part, a shell having opposite holes therein and an opening connecting the holes of sufficient size to permit insertion of an end link of the chain within the shell, an end of the chain slidable through the holes, and an end link of said chain end insertible within the shell and engaging therein said chain end to prevent it from sliding through the shell.

7. An adjustable loop comprising a ball chain, a shell having opposite holes therein and an opening connecting the holes, said shell being slidable upon said chain, the chain passing through the holes, and an end ball of said chain adapted to pass through the opening in said shell and lie adjacent one of said holes within said shell, thereby fixing the position of the shell upon the chain, substantially as described.

In testimony whereof I have signed my name to this specification.

GEORGE McCRETTON.